United States Patent [19]

Edwards

[11] Patent Number: 4,528,312

[45] Date of Patent: Jul. 9, 1985

[54] DEGRADED POLYOLEFIN CONTAINING EXTRUSION COATING COMPOSITIONS HAVING GOOD ADHESION TO A SUBSTRATE AT FAST COATING SPEEDS

[75] Inventor: Ray Edwards, Henderson, Tex.

[73] Assignee: Eastman Kodak Company, Rochester, N.Y.

[21] Appl. No.: 625,331

[22] Filed: Jun. 27, 1984

[51] Int. Cl.$^3$ .................... C08K 5/20; C08L 23/06; C08L 23/10; C08L 93/04

[52] U.S. Cl. .................................. 524/232; 524/271; 524/515

[58] Field of Search .................... 524/232, 515, 271; 526/914

[56] References Cited

U.S. PATENT DOCUMENTS

| | | | |
|---|---|---|---|
| 3,143,539 | 8/1964 | Farhat et al. | 526/914 |
| 3,176,021 | 3/1965 | Volangis et al. | 524/232 |
| 3,330,796 | 7/1967 | Mock et al. | 524/232 |
| 3,341,621 | 9/1967 | Hagemeyer, Jr. et al. | 526/914 |
| 4,394,474 | 7/1983 | McKinney et al. | 524/232 |

*Primary Examiner*—Allan M. Lieberman
*Attorney, Agent, or Firm*—Clyde L. Tootle; Daniel B. Reece, III

[57] ABSTRACT

This invention relates to novel blends containing degraded crystalline polypropylene or propylene containing copolymer, low density polyethylene, hydrocarbon tackifying resin, and a fatty acid amide useful as extrusion coating compositions which provide coatings having good coatability and good heat sealability. These coated substrates then can be used in fabricating bags and other packaging applications. Particularly, these coatings are a blend of a degraded crystalline polypropylene, or propylene containing copolymer, low density polyethylene, hydrocarbon tackifying resin, and a fatty acid amide containing 16 to 40 carbon atoms.

26 Claims, No Drawings

DEGRADED POLYOLEFIN CONTAINING EXTRUSION COATING COMPOSITIONS HAVING GOOD ADHESION TO A SUBSTRATE AT FAST COATING SPEEDS

DESCRIPTION

This invention relates to novel polyolefin containing blends which provide extrusion coatings having good coatability, good adhesion to the substrate, and good heat seal strength at low coating temperatures. One aspect of this invention relates to an extrusion coating blend containing: (1) a degraded crystalline polypropylene or propylene/alpha-olefin copolymer containing at least 80 weight percent polymerized propylene, (2) a low density polyethylene, (3) a tackifying resin, and (4) a fatty acid amide. These blends provide coating compositions having good coatability, good adhesion to the substrate, substantially no pinholes, and good heat seal strength at an extrusion coating temperature of about 204° C.

Extruding a coating of a polyolefin or blends of polyolefins onto a substrate, such as paper or aluminum foil, to form an extrusion coated substrate is well known in the art. Various polyethylenes and blends of polyethylenes and other polyolefins have been widely used as extrusion coating compositions. However, a polyolefin such as crystalline polypropylene alone, regardless of its molecular weight (flow rate), is not a satisfactory extrusion coating material since it does not have high speed coating ability or a wide range of coating weights. Therefore, many of its excellent physical properties cannot be utilized in extrusion coating applications. In order to improve the coating properties of polypropylene, blends of polyethylene and polypropylene were used as extrusion coating compositions. For example, U.S. Pat. No. 3,418,396 which describes and claims blends of polypropylene and polyethylene having excellent extrusion coating properties.

Although the blends disclosed in U.S. Pat. No. 3,418,396 are useful in many applications, they have the disadvantage that such blends when applied as coatings to substrates, such as paper, do not provide the necessary heat seal strength for preparing certain packaging materials. Extrusion coating compositions containing polypropylene, polyethylene, and a tackifier resin are disclosed in U.S. Pat. No. 3,652,725. These blends provide coatings having excellent adhesion to the substrate and good pinhole properties at extrusion coating temperatures of about 283° C. At this coating temperature good adhesion is obtained whereas blends without the tackifier had poor adhesion.

The blends of U.S. Pat. No. 3,652,725 while useful had the disadvantage of having coating speeds or coatability of less than 120 m./min. In order to improve coatability, blends as defined in U.S. Pat. Nos. 4,378,451 and 4,359,553 disclose coating formulations of degraded crystalline polypropylene and low density polyethylene that provide extrusion coatings which will provide both good coatability, fair adhesion to the substrate, and a heat seal strength. However, these blends require coating temperatures of about 304° C. Therefore, it would be an advance in the state of the art to provide an extrusion coating composition that could be applied to substrates at low coating temperatures and in addition can be used at good coating speeds to provide coatings having good adhesion to the substrate, low pinholes, good adhesion to the substrate, good toughness and good heat seal strengths.

In accordance with this invention, polyolefin extrusion coating compositions are provided which provide extrusion coatings having good coatability, good adhesion to the substrate, good heat seal strengths of at least 7 kg. per linear 2.5 cm., and substantially no pinholes. Such compositions are a blend of: (1) a degraded crystalline polypropylene or propylene containing copolymer containing at least 80 weight percent propylene, (2) low density polyethylene, (3) tackifying resin, and (4) fatty acid amide. These extrusion coating compositions provide a composition that has excellent adhesion to the substrate, provides coatings of less than 1 mil thickness at commercially acceptable speeds and have seal strengths of at least 7 kg. per linear 2.5 cm. Such properties are necessary in the construction of some packaging materials. The blend compositions with which this invention is concerned are as follows:

| Component | Weight Percent Contained in Composition | |
|---|---|---|
| | Broad Range | Preferred Range |
| Degraded Propylene Homo- or Copolymer | 75–90% | 80–90% |
| Low Density Polyethylene | 2.5–15% | 5–7.5% |
| Tackifier Resin | 0.5–12.5% | 5–10% |
| Fatty Acid Amide | 0.2–1.0% | 0.2–0.5% |

These blends provide excellent coatings on substrates, such as paper stock or primed aluminum foil which can be used for retortable food packages. Such uses require the coating to substrate to have a high bond strength to be useful in fabricating food packages where handling or flexibility is encountered. Depending on the end use such coated substrates should also desirably have good adhesion, flexibility, barrier properties and heat resistance. For example, retortable food storage pouches need sufficient adhesion strength to be handled during filling of the pouch, during preparation and storage and subsequent heat seal resistance during immersion in boiling water and subsequent handling.

The degraded crystalline polypropylene or propylene copolymer has a melt flow rate of about 5 to 100 dg/m at 230° C. and is prepared by degrading crystalline polymers and copolymers having a melt flow rate of 1 to 2 prepared with stereospecific catalyst by processes well known to the art. The crystalline polypropylene having a melt flow rate of 1 to 2 is degraded to a melt flow rate of about 5 to 80. A crystalline propylene/ethylene copolymer having a melt flow rate of 3 or less is degraded to a melt flow rate of 3 to 70. Such undegraded crystalline propylene containing polymers can be the commercially available crystalline polypropylene, crystalline polypropylene prepared according to U.S. Pat. No. 3,679,775, or crystalline propylene containing copolymers prepared according to U.S. Pat. No. 3,529,037. Particularly useful are crystalline polypropylenes and crystalline ethylene/propylene copolymers containing less than 5 weight percent ethylene.

The polypropylene and propylene containing copolymers can be degraded either thermally or by the use of free radical sources such as peroxides. These processes for degrading low melt flow rate polymers to prepare high melt flow rate degraded materials are conventional and well known in the art. The melt flow rate can be determined by test methods known in the art such, for example, as ASTM D-1238.

The low density polyethylene component must have a melt index at 190° C. of 0.5 to 4.5, preferably about 3.5, a density of above about 0.916 to 0.925 and a swell ratio of greater than about 1.40, preferably 1.50 or greater, most preferred about 1.70. Such polyethylenes useful in this invention are prepared by methods known to the art.

The melt index, density and swell ratio can also be determined by methods known in the art. For example, melt index can be determined by ASTM Procedure D-1238, density by ASTM D-1505 and the swell ratio is defined as the increase in the diameter of the extrudate over that of the orifice of the extrusion plastometer in ASTM Designation D1238. The diameter of the specimen is measured in the area between 1/16 inch and ⅜ inch of the initial portion of the specimen as it emerges from the extrusion plastometer. Measurements are made by standard methods per ASTM Designation D-374.

The tackifying resins useful in the compositions of this invention have Ring and Ball softening points of about 75° C. to 150° C. and can be a hydrocarbon resin such as DAC-B hydrocarbon resin prepared according to the process disclosed in U.S. Pat. No. 3,701,760 as well as other hydrocarbon resins, synthetic and natural polyterpenes, rosin esters and the like. One such suitable hydrocarbon tackifying resin is a hydrocarbon resin having a softening point of 130° C. and available commercially as Eastman Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 75° to 150° C.; an acid number of from about 0 to 2; a saponification value of less than about 1. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the rosin ester resins and the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terpentine, a terpene cut or fraction, and various other terpenes. Particularly useful resin esters are the amber colored pentaerythritol ester of rosin having an acid number of about 7 to 16 and a Ring and Ball softening point of about 100° C. to 110° C. One such resin is the pentaerythritol esters of tall oil rosin having a Ring and Ball softening point of 100° C. and an acid number of about 11.

The fatty acid amide is an amide of an aliphatic saturated or unsaturated acid having 16 to 40 carbon atoms such as erucamide, oleamide, stearamide, stearyl erucamide, and the like.

The blends of degraded propylene homo- and copolymers, low density polyethylene, tackifying resin, and fatty acid amide of the present invention have a flow rate of from about 5 to about 40. Blends having a flow rate of less than 5 do not coat at commercially acceptable speeds due to edge tear and surging. Blends having a flow rate greater than 40 also do not coat at commercially acceptable speeds due to streaking and excessive neck-in.

The amount of polyethylene contained in the blends can be from 2.5 percent to 15 percent. The amount of tackifying resin contained in the blends can be 0.5 percent to 12.5 percent. The blends containing degraded crystalline polypropylene can preferably contain 5 percent to 10 percent polyethylene and 5 percent to 10 percent tackifying resin. Blends of degraded polypropylene and polyethylene blends containing more than 12.5 percent tackifying resin have reduced coatability. Also, blends of degraded propylene/ethylene copolymer and polyethylene which preferably contain 2 percent to 10 percent tackifying resin have good coatability, i.e., greater than 180 m./min. Such blends containing less than 2 percent tackifying resin have a reduction in heat seal strength.

The compositions of the invention may be prepared in various ways such as dry blending and then passing through a compounding extruder, compounding on a milling roll or in a Banbury mixer or by fusion. Any method whereby the components can be blended together will produce the desired blend. For example, pellets of each polymer are blended mechanically and the blend is fed to an extruder wherein it is fused and extruded.

Additives, stabilizers, fillers and the like can be added to the compositions of the present invention. Preferably, these coating compositions should have some thermal stabilization due to the coatings being applied at elevated temperatures. Such materials can be present in the components forming the polymer blend, or may be added when the polymers are blended to form the extrusion coating composition.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

An extrusion coating composition having a melt flow rate of about 5 at 230° C. (ASTM D-1238) was prepared by blending 80 percent by weight of a degraded crystalline polypropylene having a 4.8 flow rate at 230° C. (ASTM D-1238), 9.8 percent by weight of polyethylene having a melt index of 3.5 dg/min at 190° C. (ASTM D-1238), density of 0.917 g/cc (ASTM D-1505), and a swell ratio of 1.7, 9.8 percent by weight hydrocarbon resin tackifier having a density of 1.028 g./cc. at 21° C., melt viscosity of about 1000 cp. at 190° C., and ring and ball softening point of 129° C., and 0.4 percent stearyl erucamide. This blend of materials was evaluated as follows: One portion of the blend was fed to a 8.9 cm. Egan extruder having a barrel length to diameter ratio of 24:1. The four zones of the extruder were maintained, from back to front, at 177° C., 190° C., 204° C., and 210° C. A metering type screw having six compression flights, and 12 metering flights were used. Prior to entering the die the melt passed through one screen of 24×24 mesh. The die was an Egan die, center-fed with 1.3 cm. long lands, with an opening of 40.6 cm×0.5 cm. The temperature of the die was held at 204° C. The extrusion rate was held constant at 73 kg. per hour. The resulting film extrudate was passed through a 13.4 cm.

air gap into the nip formed by a rubber-covered pressure roll and a chill roll. At the same time, 18.1 kg. kraft paper stock 40.6 cm. wide was fed into the nip with the pressure roll in contact with the foil. The nip pressure applied was 104.6 cm. per linear 2.5 cm. The chill roll was a 61 cm. diameter mirror finish steel roll, water cooled to maintain a temperature of 16° C. on the roll. The coated paper was taken off the mirror finished chill roll at a point 180° from the nip formed by the pressure roll and chill roll. The chill roll was operated at linear speeds of about 244 m./min. which is an excellent target range for commercial extrusion coatings. For example, at a coating speed of 244 m./min. the paper stock had a coating of about 0.6 mils and had excellent adhesion of about 240 grams per 2.5 cm. to the paper stock. The coated paper also had a heat seal strength of greater than about 9 kg. per linear 2.5 cm. as measured by a tensile tester at a jaw separation rate of 25 cm./minute when sealed at a temperature of 260° C. using a conventional bar sealer. The coated paper also had substantially no pinholes.

Another portion was extrusion coated using the same equipment and conditions except that extruder temperatures were 283° C., 293° C., 304° C., and 316° C. The chill roll was operated at a linear speed of about 244 m./min. and essentially the same coatings were obtained operating the extruder at the lower extrusion temperature.

Substituting other tackifying resins such as a pentaerythritol ester of tall oil rosin having a Ring and Ball softening point of about 100° C. and an acid number of about 11 for the tackifier resin having a Ring and Ball softening point of 129° C. provided substantially the same result.

Also, substituting a different fatty acid amide such as stearamide or erucamide for the stearyl erucamide provided substantially the same result.

This example shows that the extrusion coating compositions can be coated using relatively low extrusion temperatures and at good coating speeds to provide good coatings. In addition, these compositions allow a substantial reduction in the amount of energy required to extrusion coat these compositions. Also, the compositions can be extrusion coated at the higher normal extrusion coating temperatures thereby providing compositions which can be coated over a broad temperature range.

EXAMPLE 2

An extrusion coating composition was prepared having the flow rate of 40 according to Example 1 except that a peroxide degraded polypropylene having a melt flow rate of 50 was used to prepare the blend. The composition was extrusion coated satisfactorily at a coating speed of 210 m./min. and an adhesion of about 400 grams per 2.5 cm. The heat seal strength of this coated paper was 9 kg. per linear 2.5 cm.

This example shows that increasing the flow rate of the extrusion coating blend to about 40 still provides a useful extrusion coating composition having good coatability, good adhesion and good heat seal strength.

EXAMPLE 3

An extrusion coating composition was prepared according to Example 1 except that about 80 percent of a degraded crystalline polypropylene having a melt flow rate of about 2 was used to provide an extrusion coatable blend having a flow rate of about 2. The composition was extrusion coated at a coating speed of about 122 m./min. and had severe and unacceptable edge tear.

This example shows that increasing the blend melt flow rate less than 5 does not provide a commercially desirable extrusion coating composition.

EXAMPLE 4

An extrusion coating composition was prepared according to Example 1 except that a peroxide degraded crystalline polypropylene having a melt flow rate of about 45 was used to provide an extrusion coatable blend having a flow rate of about 50. The composition coated at a coating speed of about 91 m./min. and had excessive neck-in of greater than 10.2 cm. per bead.

This example shows that increasing the blend melt flow rate greater than 40 does not provide a commercially desirable extrusion coating composition.

EXAMPLE 5

A extrusion coating composition having a melt flow rate of 16 was prepared and tested according to Example 1 except that 80 percent degraded crystalline polypropylene having a flow rate of 15 was used. The composition was extrusion coated to kraft paper satisfactorily at a coating speed of 400 m./min. and had an adhesion of about 400 grams per 2.5 cm. The heat sealability of extrusion coating was 9 kg. per linear 2.5 cm.

This example shows that a coating composition having a blend flow rate of 22 has good coatability and heat sealability of the coated substrate is at least 9 kg. per linear 2.5 cm.

EXAMPLE 6

An extrusion coating composition was prepared having a flow rate of 25 and tested according to Example 1 except that a peroxide degraded crystalline propylene-/ethylene copolymer having a flow rate of 30 and an ethylene content of about 1.2 percent by weight was used and 20 percent polyethylene and 10 percent tackifier were used. The composition was extrusion coated to unprimed aluminum foil satisfactorily. The heat seal strength of this coating was 9 kg. per linear 2.5 cm. and at coatability speeds of greater than 305 m./min. provided coatings of less than 0.5 mils and adhesion of 400 grams per 2.5 cm.

This example shows that a peroxide degraded propylene/ethylene copolymer can be used in place of polypropylene to provide acceptable coatings.

EXAMPLE 7

An extrusion coating composition was prepared and tested according to Example 1 except that the stearyl erucamide was deleted from the coating formulation and coated at 204° C. The maximum coating speed obtained with this blend was about 85 m./min. due to the sticking of the coating onto the chill roll surface.

This example shows that when the fatty acid amine is deleted, the coatability or coating speed of the coating formulation is reduced by over 100 percent from that obtained by Example 1.

This example was repeated except that the coating temperature was raised to 283° C. The maximum coating speed obtained at this temperature is about 60 m./min.

EXAMPLE 8

An extrusion coating composition was prepared having a blend flow rate of 20 and tested according to Example 1 except that the amount of stearyl erucamide was increased to 0.4 percent and the amount of degraded polypropylene was 85%, the flow rate was 22, and polyethylene was decreased by 7.5 percent and the hydrocarbon tackifier was 7.5 percent. The coating speed of this blend was greater than 400 m./min. Adhesion was 400 grams.

This example was repeated using only 0.2 weight percent of the amide with the amounts of polypropylene and polyethylene adjusted and the tackifier was 7.5 percent. The coating speed was about 140 m./min.

Repeating this example using 1.0 percent amide the coating speed was greater than 400 m./min. and adhesion was the same.

EXAMPLE 9

An extrusion coating composition having a melt flow rate of 10 was prepared and tested according to Example 1 except that the amount of hydrocarbon tackifier was increased to 15 percent and the amount of degraded polypropylene decreased to 75 percent by weight. The coating speed of this blend containing 0.4 percent stearylamide was only about 120 m./min. Blends were prepared with the amount of stearyl erucamide at 0.2 percent by weight, 0.8 percent by weight and 1.0 percent by weight with similar reductions in the amount of polypropylene. The coating speed of these blends was about 60 m./min., about 150 m./min., and about 150 m./min., respectively.

The invention has been described in detail with particular reference to preferred embodiments thereof, but it will be understood that variations and modifications can be effected within the spirit and scope thereof.

I claim:

1. An extrusion coating composition having a flow rate of 5 to 40 dg/min. at 230° C. which provides coatings of less than 1 mil which have heat seal strengths of at least 7 kg. per linear 2.5 cm. at coating speeds greater than 180 m./min. comprising a blend of (1) about 90 to 75 percent, by weight, of at least one degraded crystalline polypropylene or propylene containing copolymer containing at least 80 weight percent propylene and having a melt flow rate of 1 to 100 dg/min. at 230° C., and (2) about 2.5 to 15 percent, by weight, of at least one polyethylene having a density of 0.916 to 0.925, a melt index at 190° C. of 2 to 7, and a swell ratio of about 1.5 to 2.2, about 0.5 to 12.5 percent, by weight, of a hydrocarbon tackifying resin, and about 0.2 to 1.0 percent, by weight, fatty acid amide containing 16 to 40 carbon atoms.

2. An extrusion coating composition according to claim 1 wherein said degraded crystalline polypropylene or propylene containing copolymer is crystalline polypropylene.

3. An extrusion coating composition according to claim 2 wherein said degraded crystalline polypropylene has a melt flow rate of 15 at 230° C.

4. An extrusion coating composition according to claim 3 wherein said low density polyethylene has a melt index of 3.5 dg/min. at 190° C., a density of 0.917 g/cc, and a swell ratio of 1.70.

5. An extrusion composition according to claim 4 wherein said tackifying resin is a hydrocarbon tackifying resin having a Ring and Ball softening point of about 130° C.

6. An extrusion coating composition according to claim 4 wherein said tackifying resin is pentaerythritol ester of tall oil rosin having a Ring and Ball softening point of about 100° C. and an acid number of about 11.

7. An extrusion coating composition according to claim 6 wherein said fatty acid amide is stearyl erucamide.

8. An extrusion coating composition according to claim 2 wherein said degraded crystalline polypropylene or propylene containing copolymer is crystalline ethylene/propylene copolymer containing less than 5 weight percent ethylene.

9. An extrusion coating composition according to claim 8 wherein said degraded crystalline ethylene/propylene copolymer has a melt flow rate of 10 at 230° C.

10. An extrusion coating composition according to claim 9 wherein said low density polyethylene has a melt index of 3.5 dg/min. at 190° C., a density of 0.917 g/cc, and a swell ratio of 1.70.

11. An extrusion composition according to claim 10 wherein said tackifying resin is a hydrocarbon tackifying resin having a Ring and Ball softening point of about 130° C.

12. An extrusion coating composition according to claim 10 wherein said tackifying resin is pentaerythritol ester of tall oil rosin having a Ring and Ball softening point of about 100° C. and an acid number of about 11.

13. An extrusion coating composition according to claim 12 wherein said fatty acid amide is stearyl erucamide.

14. An extrusion coating composition having a flow rate of 5 to 40 dg/min. at 230° C. which provides coatings of less than 1 mil which have heat seal stengths of at least 7 kg. per linear 2.5 cm. at coating speeds greater than 180 m./min. comprising a blend of (1) about 90 to 80 percent, by weight, of at least one degraded crystalline polypropylene or propylene containing copolymer containing at least 80 weight percent propylene and having a melt flow rate of 1 to 100 dg/min. at 230° C., and (2) about 5 to 7.5 percent, by weight, of at least one polyethylene having a density of 0.916 to 0.925, a melt index at 190° C. of 2 to 7, and a swell ratio of about 1.5 to 2.2, about 0.5 to 10 percent, by weight, of a hydrocarbon tackifying resin, and about 0.2 to 0.5 percent, by weight, fatty acid amide containing 16 to 40 carbon atoms.

15. An extrusion coating composition according to claim 14 wherein said degraded crystalline polypropylene or propylene containing copolymer is crystalline polypropylene.

16. An extrusion coating composition according to claim 15 wherein said degraded crystalline polypropylene has a melt flow rate of 15 at 230° C.

17. An extrusion coating composition according to claim 16 wherein said low density polyethylene has a melt index of 3.5 dg/min. at 190° C., a density of 0.917 g/cc, and a swell ratio of 1.70.

18. An extrusion composition according to claim 17 wherein said tackifying resin is a hydrocarbon tackifying resin having a Ring and Ball softening point of about 130° C.

19. An extrusion coating composition according to claim 17 wherein said tackifying resin is pentaerythritol ester of tall oil rosin having a Ring and Ball softening point of about 100° C. and an acid number of about 11.

20. An extrusion coating composition according to claim 19 wherein said fatty acid amide is stearyl erucamide.

21. An extrusion coating composition according to claim 15 wherein said degraded crystalline polypropylene or propylene containing copolymer is crystalline ethylene/propylene copolymer containing less than 5 weight percent ethylene.

22. An extrusion coating composition according to claim 21 wherein said degraded crystalline ethylene/propylene copolymer has a melt flow rate of 10 at 230° C.

23. An extrusion coating composition according to claim 22 wherein said low density polyethylene has a melt index of 3.5 dg/min. at 190° C., a density of 0.917 g/cc, and a swell ratio of 1.70.

24. An extrusion composition according to claim 23 wherein said tackifying resin is a hydrocarbon tackifying resin having a Ring and Ball softening point of about 130° C.

25. An extrusion coating composition according to claim 23 wherein said tackifying resin is pentaerythritol ester of tall oil rosin having a Ring and Ball softening point of about 100° C. and an acid number of about 11.

26. An extrusion coating composition according to claim 25 wherein said fatty acid amide is stearyl erucamide.

* * * * *